(12) United States Patent
Wang

(10) Patent No.: US 8,311,124 B2
(45) Date of Patent: Nov. 13, 2012

(54) DECODING METHOD AND APPARATUS

(75) Inventor: Wen-Shan Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 719 days.

(21) Appl. No.: 12/497,777

(22) Filed: Jul. 6, 2009

(65) Prior Publication Data

US 2010/0124286 A1 May 20, 2010

(30) Foreign Application Priority Data

Nov. 18, 2008 (TW) ................................ 97144573 A

(51) Int. Cl.
*H04B 1/66* (2006.01)

(52) U.S. Cl. .................................. 375/240.25

(58) Field of Classification Search .................. 375/240.25–240.29; *H04B 1/66*
See application file for complete search history.

(56) References Cited

U.S. PATENT DOCUMENTS

| | | | |
|---|---|---|---|
| 4,821,290 A | 4/1989 | Hingorami et al. | |
| 4,853,696 A | 8/1989 | Mukherjee | |
| 5,628,002 A | 5/1997 | Woodrum | |
| 6,009,203 A | 12/1999 | Liu et al. | |
| 6,188,797 B1 | 2/2001 | Moledina et al. | |
| 6,289,349 B1 | 9/2001 | Woodrum | |
| 6,563,441 B1 | 5/2003 | Gold | |
| 6,654,868 B2 | 11/2003 | Tamatsu | |
| 6,731,643 B1 | 5/2004 | Cucchi et al. | |
| 6,934,252 B2 | 8/2005 | Mehrotra et al. | |
| 7,340,103 B2 * | 3/2008 | Smirnov | 382/245 |
| 7,898,444 B2 * | 3/2011 | Wang et al. | 341/65 |
| 7,932,843 B2 * | 4/2011 | Demircin et al. | 341/107 |

OTHER PUBLICATIONS

Marpe, D., et al.; "Context-Based Adaptive Binary Arithmetic Coding in the H264/AVC Video Compression Standard;" IEEE Transactions on Circuits and Systems for Video Technology, vol. 13, No. 7, Jul. 2003.

* cited by examiner

*Primary Examiner* — Tung Vo
(74) *Attorney, Agent, or Firm* — Thomas|Kayden

(57) ABSTRACT

A decoding method and a decoding apparatus is provided. The decoding apparatus includes a control unit, a lookup unit, an arithmetic unit, a first switch and a second switch. The control unit receives a part of a bin string. The lookup unit finds out a flag, a length and an indicator, corresponding to the part of the bin string, from a lookup table according to the part of the bin string and a node, and judges whether the flag is equal to a predetermined value. The arithmetic unit finds out a syntax element symbol corresponding to the bin string according to a basic syntax element symbol. The first switch connects the control unit to the lookup unit or the arithmetic unit. The second switch outputs the indicator as the basic syntax element symbol to the arithmetic unit or feeds the indicator as a next node back to the lookup unit.

22 Claims, 19 Drawing Sheets

| SES | BS | SES | BS |
|---|---|---|---|
| 0 | 0 | 12 | 1110 000 |
| 1 | 100 | 13 | 1110 001 |
| 2 | 101 | 14 | 1110 010 |
| 3 | 1100 00 | 15 | 1110 011 |
| 4 | 1100 01 | 16 | 1110 100 |
| 5 | 1100 10 | 17 | 1110 101 |
| 6 | 1100 11 | 18 | 1110 110 |
| 7 | 1101 00 | 19 | 1110 111 |
| 8 | 1101 01 | 20 | 1111 000 |
| 9 | 1101 10 | 21 | 1111 001 |
| 10 | 1101 11 | 22 | 1111 11 |
| 11 | 1111 10 | 23 | 1111 01 |

FIG. 1(PRIOR ART)

| Input | | Output | | Input | | Output | | Input | | Output | |
|---|---|---|---|---|---|---|---|---|---|---|---|
| Node | Bin | NodeSE | Flag | Node | Bin | NodeSE | Flag | Node | Bin | NodeSE | Flag |
| 0 | 0 | 0 | 1 | 8 | 0 | 14 | 0 | 16 | 0 | 7 | 1 |
| 0 | 1 | 1 | 0 | 8 | 1 | 15 | 0 | 16 | 1 | 8 | 1 |
| 1 | 0 | 7 | 0 | 9 | 0 | 16 | 0 | 17 | 0 | 9 | 1 |
| 1 | 1 | 2 | 0 | 9 | 1 | 17 | 0 | 17 | 1 | 10 | 1 |
| 2 | 0 | 4 | 0 | 10 | 0 | 18 | 0 | 18 | 0 | 12 | 1 |
| 2 | 1 | 3 | 0 | 10 | 1 | 19 | 0 | 18 | 1 | 13 | 1 |
| 3 | 0 | 5 | 0 | 11 | 0 | 20 | 0 | 19 | 0 | 14 | 1 |
| 3 | 1 | 6 | 0 | 11 | 1 | 21 | 0 | 19 | 1 | 15 | 1 |
| 4 | 0 | 8 | 0 | 12 | 0 | 22 | 0 | 20 | 0 | 16 | 1 |
| 4 | 1 | 9 | 0 | 12 | 1 | 23 | 0 | 20 | 1 | 17 | 1 |
| 5 | 0 | 10 | 0 | 13 | 0 | 11 | 1 | 21 | 0 | 18 | 1 |
| 5 | 1 | 11 | 0 | 13 | 1 | 12 | 1 | 21 | 1 | 19 | 1 |
| 6 | 0 | 12 | 0 | 14 | 0 | 3 | 1 | 22 | 0 | 20 | 1 |
| 6 | 1 | 13 | 0 | 14 | 1 | 4 | 1 | 22 | 1 | 21 | 1 |
| 7 | 0 | 1 | 1 | 15 | 0 | 5 | 1 | | | | |
| 7 | 1 | 2 | 1 | 15 | 1 | 6 | 1 | | | | |

FIG. 2 (PRIOR ART)

| Input | | | Output | | | Input | | | Output | | | Input | | | Output | | |
|---|---|---|---|---|---|---|---|---|---|---|---|---|---|---|---|---|---|
| Node | Bin | | NodeSE | Flag | | Node | Bin | | NodeSE | Flag | | Node | Bin | | NodeSE | Flag | |
| 0 | 0 | | 0 | 1 | | 8 | 0 | | 14 | 0 | | 16 | 0 | | 7 | 1 | |
| 0 | 1 | | 1 | 0 | | 8 | 1 | | 15 | 0 | | 16 | 1 | | 8 | 1 | |
| 1 | 0 | | 7 | 0 | | 9 | 0 | | 16 | 0 | | 17 | 0 | | 9 | 1 | |
| 1 | 1 | | 2 | 0 | | 9 | 1 | | 17 | 0 | | 17 | 1 | | 10 | 1 | |
| 2 | 0 | | 4 | 0 | | 10 | 0 | | 18 | 0 | | 18 | 0 | | 12 | 1 | |
| 2 | 1 | | 3 | 0 | | 10 | 1 | | 19 | 0 | | 18 | 1 | | 13 | 1 | |
| 3 | 0 | | 5 | 0 | | 11 | 0 | | 20 | 0 | | 19 | 0 | | 14 | 1 | |
| 3 | 1 | | 6 | 0 | | 11 | 1 | | 21 | 0 | | 19 | 1 | | 15 | 1 | |
| 4 | 0 | | 8 | 0 | | 12 | 0 | | 22 | 0 | | 20 | 0 | | 16 | 1 | |
| 4 | 1 | | 9 | 0 | | 12 | 1 | | 23 | 1 | | 20 | 1 | | 17 | 1 | |
| 5 | 0 | | 10 | 0 | | 13 | 0 | | 11 | 1 | | 21 | 0 | | 18 | 1 | |
| 5 | 1 | | 11 | 0 | | 13 | 1 | | 12 | 1 | | 21 | 1 | | 19 | 1 | |
| 6 | 0 | | 12 | 0 | | 14 | 0 | | 3 | 1 | | 22 | 0 | | 20 | 1 | |
| 6 | 1 | | 13 | 0 | | 14 | 1 | | 4 | 1 | | 22 | 1 | | 21 | 1 | |
| 7 | 0 | | 1 | 1 | | 15 | 0 | | 5 | 1 | | | | | | | |
| 7 | 1 | | 2 | 1 | | 15 | 1 | | 6 | 1 | | | | | | | |

FIG. 3 (PRIOR ART)

| SES | BS |
|---|---|
| 0 | 0 |
| 1 | 10 |
| 2 | 110 |
| 3 | 1110 |
| 4 | 11110 |
| ..... | ...... |

FIG. 4

| SES | BS |
|---|---|
| 0 | 0 |
| 1 | 10 |
| 2 | 110 |
| 3 | 1110 |
| 4 | 1111 |
| N/A ||

FIG. 5

| SES | BS | SES | BS |
|---|---|---|---|
| 0 | 0 | 12 | 1110 000 |
| 1 | 100 | 13 | 1110 001 |
| 2 | 101 | 14 | 1110 010 |
| 3 | 1100 00 | 15 | 1110 011 |
| 4 | 1100 01 | 16 | 1110 100 |
| 5 | 1100 10 | 17 | 1110 101 |
| 6 | 1100 11 | 18 | 1110 110 |
| 7 | 1101 00 | 19 | 1110 111 |
| 8 | 1101 01 | 20 | 1111 000 |
| 9 | 1101 10 | 21 | 1111 001 |
| 10 | 1101 11 | 23 | 1111 01 |
| | | 11 | 1111 10 |
| | | 22 | 1111 11 |

FIG. 7

| SES | BS | SES | BS |
|---|---|---|---|
| 0 | 0 | 12 | 1110 000 |
| 1 | 100 | 13 | 1110 001 |
| 2 | 101 | 14 | 1110 010 |
| 3 | 1100 00 | 15 | 1110 011 |
| 4 | 1100 01 | 16 | 1110 100 |
| 5 | 1100 10 | 17 | 1110 101 |
| 6 | 1100 11 | 18 | 1110 110 |
| 7 | 1101 00 | 19 | 1110 111 |
| 8 | 1101 01 | 20 | 1111 000 |
| 9 | 1101 10 | 21 | 1111 001 |
| 10 | 1101 11 | 23 | 1111 01 |
|  |  | 11 | 1111 10 |
|  |  | 22 | 1111 11 |

FIG. 8

| SES | BS | SES | BS |
|---|---|---|---|
| 0 | 0 | 12 | 1110 000 |
| 1 | 100 | 13 | 1110 001 |
| 2 | 101 | 14 | 1110 010 |
| 3 | 1100 00 | 15 | 1110 011 |
| 4 | 1100 01 | 16 | 1110 100 |
| 5 | 1100 10 | 17 | 1110 101 |
| 6 | 1100 11 | 18 | 1110 110 |
| 7 | 1101 00 | 19 | 1110 111 |
| 8 | 1101 01 | 20 | 1111 000 |
| 9 | 1101 10 | 21 | 1111 001 |
| 10 | 1101 11 | 23 | 1111 01 |
|  |  | 11 | 1111 10 |
|  |  | 22 | 1111 11 |

FIG. 9

| SES | BS | SES | BS |
|---|---|---|---|
| 0 | 0 | 12 | 1110 000 |
| 1 | 100 | 13 | 1110 001 |
| 2 | 101 | 14 | 1110 010 |
| 3 | 1100 00 | 15 | 1110 011 |
| 4 | 1100 01 | 16 | 1110 100 |
| 5 | 1100 10 | 17 | 1110 101 |
| 6 | 1100 11 | 18 | 1110 110 |
| 7 | 1101 00 | 19 | 1110 111 |
| 8 | 1101 01 | 20 | 1111 000 |
| 9 | 1101 10 | 21 | 1111 001 |
| 10 | 1101 11 | 23 | 1111 01 |
| | | 11 | 1111 10 |
| | | 22 | 1111 11 |

810(1) → row 0; 810(2) → rows 1–2; 810(3) → rows 3–10; 810(4) → rows 12–19; 810(5) → rows 20–21; 810(6) → row 23; 810(7) → row 11; 810(8) → row 22

FIG. 10

| BSES | BBS | L | BSES | BBS | L |
|---|---|---|---|---|---|
| 0 | 0 | 0 | 20 | 1111 00 | 1 |
| 1 | 10 | 1 | 23 | 1111 01 | 0 |
| 3 | 110 | 3 | 11 | 1111 10 | 0 |
| 12 | 1110 | 3 | 22 | 1111 11 | 0 |

FIG. 11

| Input | | Output | | |
|---|---|---|---|---|
| Node | Bin | NodeSE | Flag | L |
| 0 | 0 | 0 | 1 | 0 |
| 0 | 1 | 1 | 0 | 1 |
| 1 | 0 | 1 | 1 | 1 |
| 1 | 1 | 2 | 0 | 1 |
| 2 | 0 | 3 | 1 | 3 |
| 2 | 1 | 3 | 0 | 1 |
| 3 | 0 | 12 | 1 | 3 |
| 3 | 1 | 4 | 0 | 1 |
| 4 | 0 | 5 | 0 | 1 |
| 4 | 1 | 6 | 0 | 1 |
| 5 | 0 | 20 | 1 | 1 |
| 5 | 1 | 23 | 1 | 0 |
| 6 | 0 | 11 | 1 | 0 |
| 6 | 1 | 22 | 1 | 0 |

FIG. 12

| Input | | Output | | |
|---|---|---|---|---|
| Node | Bin | NodeSE | Flag | L |
| 0 | 0 | 0 | 1 | 0 |
| 0 | 1 | 1 | 0 | 1 |
| 1 | 0 | 1 | 1 | 1 |
| 1 | 1 | 2 | 0 | 1 |
| 2 | 0 | 3 | 1 | 3 |
| 2 | 1 | 3 | 0 | 1 |
| 3 | 0 | 12 | 1 | 3 |
| 3 | 1 | 4 | 0 | 1 |
| 4 | 0 | 5 | 0 | 1 |
| 4 | 1 | 6 | 0 | 1 |
| 5 | 0 | 20 | 1 | 1 |
| 5 | 1 | 23 | 1 | 0 |
| 6 | 0 | 11 | 1 | 0 |
| 6 | 1 | 22 | 1 | 0 |

FIG. 16

| | BSES | L | BBS | L | BBS |
|---|---|---|---|---|---|
| 910(1) | 0 | 0 | 0 | 0 | 0 |
| 910(2) | 1 | 1 | 10 | 1 | 10 |
| 910(3) | 3 | 3 | 110 | 3 | 110 |
| 910(4) | 12 | 3 | 1110 | 3 | 1110 |
| 910(5) | 20 | 1 | 1111 00 | 2 | 1111 |
| | 23 | 0 | 1111 01 | | |
| | 11 | 0 | 1111 10 | | |
| | 22 | 0 | 1111 11 | | |

FIG. 17

| BSES | L | BBS | L | BBS |
|---|---|---|---|---|
| 0 | | | 0 | 0 |
| 1 | | | 1 | 10 |
| 3 | | | 3 | 110 |
| 12 | | | 3 | 1110 |
| 20 | 1 | 00 | 2 | 1111 |
| 23 | 0 | 01 | | |
| 11 | 0 | 10 | | |
| 22 | 0 | 11 | | |

FIG. 18

| Input | | Output | | |
|---|---|---|---|---|
| Node | Bin | NodeSE | Flag | L |
| 0 | 0 | 0 | 1 | 0 |
| 0 | 1 | 1 | 0 | 1 |
| 1 | 0 | 1 | 1 | 1 |
| 1 | 1 | 2 | 0 | 1 |
| 2 | 0 | 3 | 1 | 3 |
| 2 | 1 | 3 | 0 | 1 |
| 3 | 0 | 12 | 1 | 3 |
| 3 | 1 | 4 | 0 | 2 |
| 4 | 00 | 20 | 1 | 1 |
| 4 | 01 | 23 | 1 | 0 |
| 4 | 10 | 11 | 1 | 0 |
| 4 | 11 | 22 | 1 | 0 |

FIG. 20

| Input | | Output | | |
|---|---|---|---|---|
| Node | Bin | NodeSE | Flag | L |
| 0 | 0 | 0 | 1 | 0 |
| 0 | 1 | 1 | 0 | 1 |
| 1 | 0 | 1 | 1 | 1 |
| 1 | 1 | 2 | 0 | 1 |
| 2 | 0 | 3 | 1 | 3 |
| 2 | 1 | 3 | 0 | 1 |
| 3 | 0 | 12 | 1 | 3 |
| 3 | 1 | 4 | 0 | 2 |
| 4 | 00 | 20 | 1 | 1 |
| 4 | 01 | 23 | 1 | 0 |
| 4 | 10 | 11 | 1 | 0 |
| 4 | 11 | 22 | 1 | 0 |

FIG. 21

| Input | | Output | | |
|---|---|---|---|---|
| Node | Count/Bin | NodeSE | Flag | BinLength |
| 0 | 0 | 0 | 1 | 0 |
| 0 | 1 | 1 | 1 | 1 |
| 0 | 2 | 3 | 1 | 3 |
| 0 | 3 | 12 | 1 | 3 |
| 0 | 4 | 5 | 0 | 2 |
| 5 | 00 | 20 | 1 | 1 |
| 5 | 01 | 23 | 1 | 0 |
| 5 | 10 | 11 | 1 | 0 |
| 5 | 11 | 22 | 1 | 0 |

FIG. 24

| Input | | Output | | |
|---|---|---|---|---|
| Node | Count/Bin | NodeSE | Flag | BinLength |
| 0 | 0 | 0 | 1 | 0 |
| 0 | 1 | 1 | 1 | 1 |
| 0 | 2 | 3 | 1 | 3 |
| 0 | 3 | 12 | 1 | 3 |
| 0 | 4 | 5 | 0 | 2 |
| 5 | 00 | 20 | 1 | 1 |
| 5 | 01 | 23 | 1 | 0 |
| 5 | 10 | 11 | 1 | 0 |
| 5 | 11 | 22 | 1 | 0 |

FIG. 25

| SES | BS | SES | BS |
|---|---|---|---|
| 0 | 0 | 19 | 1110 111 |
| 2 | 101 | 18 | 1110 110 |
| 1 | 100 | 17 | 1110 101 |
| 10 | 1101 11 | 16 | 1110 100 |
| 9 | 1101 10 | 15 | 1110 011 |
| 8 | 1101 01 | 14 | 1110 010 |
| 7 | 1101 00 | 13 | 1110 001 |
| 6 | 1100 11 | 12 | 1110 000 |
| 5 | 1100 10 | 21 | 1111 001 |
| 4 | 1100 01 | 20 | 1111 000 |
| 3 | 1100 00 | 23 | 1111 01 |
| | | 11 | 1111 10 |
| | | 22 | 1111 11 |

FIG. 26

DECODING METHOD AND APPARATUS

CROSS-REFERENCE TO RELATED APPLICATION

This application claims the benefit of Taiwan application Serial No. 97144573, filed Nov. 18, 2008, the subject matter of which is incorporated herein by reference.

TECHNICAL FIELD

The disclosure relates in general to a decoding method and a decoding apparatus, and more particularly to a decoding method and a decoding apparatus associated with videos.

BACKGROUND

In the newest video compression standard H.264, the video compression performance is greatly enhanced because the advanced designs and tools are adopted. In one aspect thereof, the context-based adaptive binary arithmetic coding (CABAC) is adopted. The CABAC is different from the conventionally adopted variable length coding (VLC) because the arithmetic coding is added. Thus, the transmission speed and storage space may be more effectively due to the higher compression rate. In additions, the arithmetic coding may also compress the binary symbol, which has only two symbols and cannot be compressed by the variable length coding (VLC).

A syntax element (SE) compressed by the CABAC is represented by a variable length bin string. The bin string is composed of one bin or multiple bins. Each bin represents a binary symbol of 0 or 1. The CABAC has to consider the appearance probability of the syntax element symbols, so that the frequently appeared syntax element symbols are used in conjunction with the shorter bin string, and the appearance probability of each bin symbol in the bin string also has to be considered. Then, the arithmetic coding is adopted to achieve the better compression rate.

FIG. 1 (Prior Art) is a schematic illustration showing an original binarization table. In order to convert data with different syntax elements, the CABAC defines different binarization tables, such as an I-Slice MB Type binarization table, a P-Slice MB Type binarization table, a B-Slice MB Type binarization table and the like, according to different syntax elements. In the example of FIG. 1, the B-Slice MB Type binarization table will be illustrated.

The B-Slice MB Type binarization table includes a syntax element symbol (SES) field and a bin string (BS) field. The syntax element symbol field of FIG. 1 includes multiple syntax element symbols SES, such as 0, 1, 2, ..., 22 and 23. The bin string field includes multiple bin strings BS, such as 0, 100, 101, ..., 111111 and 111101, respectively corresponding to the syntax element symbols.

FIG. 2 (Prior Art) is a schematic illustration showing a binary search lookup table used by a conventional binary search decoding algorithm. As shown in FIG. 2, the B-Slice MB Type binarization table can be converted into the binary search lookup table through a specific program. The binary search lookup table includes an input field Input and an output field Output. The input field Input includes a node Node and a bin Bin, and the output field Output includes an indicator NodeSE and a flag Flag. Different nodes Node and different bins Bin respectively correspond to different indicators NodeSE and different flags Flag.

When the flag Flag is equal to 1, it represents that the binary search has ended, and the indicator NodeSE is the syntax element symbol corresponding to this bin string. Oppositely, when the flag Flag is equal to 0, it represents that the binary search has not ended yet, and the indicator NodeSE represents the next node Node. Another binary search is performed according to the next node Node and the next bin Bin.

In the de-binarization process, the syntax element symbol corresponding to the received bin string can be found out through the search step.

FIG. 3 (Prior Art) is a schematic illustration showing the binary search lookup table, from which a corresponding syntax element symbol is found out according to a bin string in the prior art. For the sake of simplicity, how the corresponding syntax element symbol 21 is found out will be illustrated by taking the bin string 1111001 of FIG. 3 as an example. The method of finding out the corresponding syntax element symbol 21 according to the bin string 1111001 includes the following search steps.

First, the node Node is initialized to "0", and the first bin Bin of the bin string is equal to "1". The first time of binary search is performed according to the node "0" and the bin "1" to find out the flag Flag and the indicator NodeSE corresponding to the node "0" and the bin "1". At this time, the flag Flag is "0" and the indicator NodeSE is "1". Because the flag Flag is "0", it represents that the search has not ended yet. Because the indicator NodeSE is "1", it represents that the next node is "1".

Next, the node Node is equal to "1", and the second bin of the bin string is equal to "1". The second time of binary search is performed according to the node "1" and the bin "1" to find out the flag Flag and the indicator NodeSE corresponding to the node "1" and the bin "1". At this time, the flag Flag is "0" and the indicator NodeSE is "2". Because the flag Flag is "0", it represents that the search has not ended yet. Because the indicator NodeSE is "2", it represents that the next node Node is "2".

Thereafter, the node Node is equal to "2", and the third bin of the bin string is equal to "1". The third time of binary search is performed according to the node "2" and the bin "1" to find out the flag Flag and the indicator NodeSE corresponding to the node "2" and the bin "1". At this time, the flag Flag is "0", and the indicator NodeSE is "3". Because the flag Flag is "0", it represents that the search has not ended yet. Because the indicator NodeSE is "3", it represents that the next node Node is "3".

Then, the node Node is equal to "3", and the fourth bin of the bin string is equal to "1". The fourth time of binary search is performed according to the node "3" and the bin "1" to find out the flag Flag and the indicator NodeSE corresponding to the node "3" and the bin "1". At this time, the flag Flag is "0" and the indicator NodeSE is "6". Because the flag Flag is "0", it represents that the search has not ended yet. Because the indicator NodeSE is "6", it represents that the next node Node is "6".

Next, the node Node is equal to "6" and the fifth bin of the bin string is equal to "1". The fifth time of binary search is performed according to the node "6" and the bin "1" to find out the flag Flag and the indicator NodeSE corresponding to the node "6" and the bin "1". At this time, the flag Flag is "0" and the indicator NodeSE is "12". Because the flag Flag is "0", it represents that the search has not ended yet. Because the indicator NodeSE is "12", it represents that the next node Node is "12".

Thereafter, the node Node is equal to "12", and the sixth bin of the bin string is equal to "0". The sixth time of binary search is performed according to the node "12" and the bin "0" to find out the flag Flag and the indicator NodeSE corresponding to the node "12" and the bin "0". At this time, the flag Flag is "0" and the indicator NodeSE is "22". Because the flag Flag is "0", it represents that the search has not ended yet. Because the indicator NodeSE is "22", it represents that the next node Node is "22".

Finally, the node Node is equal to "22", and the seventh bin of the bin string is equal to "1". The seventh time of binary search is performed according to the node "22" and the bin "1" to find out the flag Flag and the indicator NodeSE corresponding to the node "22" and the bin "1". At this time, the flag Flag is "1" and the indicator NodeSE is "21". Because the flag Flag is "1", it represents that the search has ended. Because the indicator NodeSE is "21", it represents that the syntax element symbol corresponding to the bin string "1111001" is "21".

SUMMARY

According to an exemplary embodiment, a decoding apparatus including a control unit, a lookup unit, an arithmetic unit, a first switch and a second switch is provided. The control unit receives a part of a bin string. The lookup unit finds a flag, a length, and an indicator from a lookup table according to the part of the bin string and a node, and judges whether the flag is equal to a predetermined value. The length represents the number of bins needed in the next lookup or calculation. When the flag isn't equal to the predetermined value, the indicator is a next node. When the flag is equal to the predetermined value, the indicator is a basic syntax element symbol. The arithmetic unit calculates a syntax element symbol corresponding to the bin string according to the basic syntax element symbol. The first switch selectively connects the control unit to the lookup unit or the arithmetic unit. The second switch selectively outputs the indicator as the basic syntax element symbol to the arithmetic unit or outputs the indicator as the next node fed back to the lookup unit.

According to another exemplary embodiment, a decoding method is provided. The decoding method includes the steps of: receiving a part of a bin string; finding out a flag, a length and an indicator from a lookup table according to the part of the bin string and a node; and judging whether the flag is equal to a predetermined value. When the flag isn't equal to the predetermined value, the indicator is a next node. When the flag is equal to the predetermined value, the indicator is a basic syntax element symbol, and a syntax element symbol corresponding to the bin string is found out according to the basic syntax element symbol. The length indicates the number of bins of the part of the bin string needed in the next lookup or calculation.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments and, together with the description, serve to explain the principles of the invention.

BRIEF DESCRIPTION OF THE DRAWINGS

FIG. 1 (Prior Art) is a schematic illustration showing an original binarization table.

FIG. 2 (Prior Art) is a schematic illustration showing a binary search lookup table.

FIG. 3 (Prior Art) is a schematic illustration showing how the binary search lookup table decodes a syntax element symbol from a bin string 1111001.

FIG. 4 is a schematic example showing a U-type binarization table.

FIG. 5 is a schematic example showing a TU-type binarization table.

FIGS. 7 to 11 are schematic examples showing the generation of the trimmed binarization table.

FIG. 12 is a schematic example showing a trimmed binary search lookup table.

FIG. 16 is a schematic example showing how to decode a syntax element symbol from a bin string 1111001 by using the trimmed binary search lookup table, according to an exemplary embodiment.

FIGS. 17 and 18 are schematic examples showing the generation of a nest trimmed binarization table.

FIG. 20 is a schematic example showing a nest trimmed binary search lookup table.

FIG. 21 is a schematic example showing how to decode a syntax element symbol from a bin string 1111001 by using the nest trimmed binary search lookup table.

FIG. 24 is a schematic example showing a nest trimmed lookup table.

FIG. 25 is a schematic example showing how to decode a syntax element symbol from a bin string 1111001 by using the nest trimmed lookup table.

FIG. 26 is a schematic example showing a trimmed binarization table arranged in a descending order.

DETAILED DESCRIPTION

In general, the binarization tables of H.264 may be classified into two types including a tabulation type and a non-tabulation type. The tabulation type needs a predefined table, such as an I-Slice MB Type binarization table, a P-Slice MB Type binarization table, a B-Slice MB Type binarization table or the like. The non-tabulation type does not need a predefined table but does need a predefined process. The non-tabulation type itself can generate the required table through the process. The processes of the non-tabulation type include unary (U) binarization process, truncated unary (TU) binarization process, and fixed length (FL) binarization process etc. They are respectively referred to as the U-type, the TU-type and the FL-Type. The FL-Type is to perform the coding on each syntax element symbol (SES) with the fixed number of bins, and is well known in the art, so detailed descriptions thereof will be omitted.

FIG. 4 is a schematic example showing a U-type binarization table. As shown in FIG. 4, when the syntax element symbols SES are 0, 1, 2, 3 and 4, the corresponding bin strings BS are sequentially "0", "10", "110", "1110" and "11110". It is obtained, from the arrangement rule, that each bin string BS ends with the bin "0" in the U-type process. The syntax element symbol SES is equal to the number of leading 1's in the corresponding bin string.

FIG. 5 is a schematic example showing a TU-type binarization table. As shown in FIG. 5, the TU-type process is similar to the U-type process except that the least significant bin (LSB) of the last bin string BS in TU-type process ends with "1" rather than the bin "0". In addition, the TU-type process needs one maximum length to create TU-type binarization table. When the number of "1" bins of the bin string is the same as the maximum length, it also represents that the bin string BS has reached the end. In the example of FIG. 5, the maximum length is equal to 4. So, the bin string BS not only ends with the bin "0" but also ends when the number of "1" bins equals to 4 in FIG. 5. Compared FIG. 4 with FIG. 5, it is further found that the U-type process is a special case of the TU-type process. We can consider that U-type process is a TU-type process with the maximum length equals to the infinity in theorem or an extremely large value in practice. Thereafter, in this application, the TU-type covers the U-type.

The disclosure provides several embodiments of a decoding method and a decoding apparatus, which will be described in details.

Figure 6:
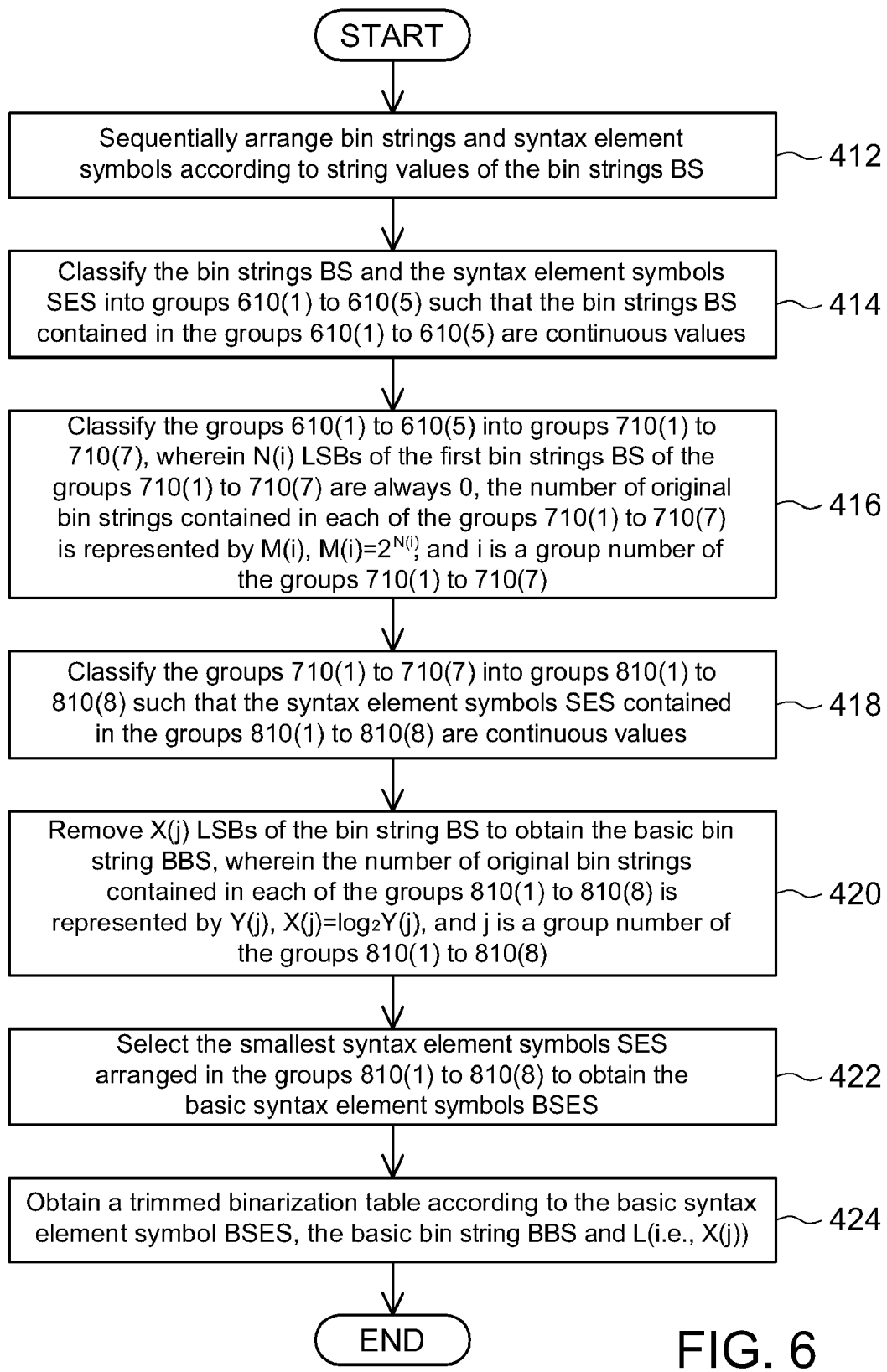
FIG. 6 is a flow chart showing an example method of generating a trimmed binarization table.

FIG. 6 is a flow chart showing an example method of generating a trimmed binarization table. FIGS. 7 to 11 are schematic examples showing the generation of the trimmed binarization table. For the sake of simplicity, a trimmed B-Slice MB Type binarization table in FIGS. 7 to 11 will be described as an example. Compared with FIG. 1, the table of FIG. 1 may be regarded as an original binarization table, and the bin string BS and the syntax element symbol SES of FIG. 1 may be respectively regarded as an original bin string and an original syntax element symbol. The trimmed binarization table of FIG. 11 is regarded as being generated after the table of FIG. 1 has been trimmed. However, the invention is not limited thereto, and one of ordinary skill in the art may change the type of the binarization table according to the actual application without departing from the spirit and scope of the invention.

The method of generating the trimmed binarization table includes the following steps. First, as shown in step 412, the bin strings BS and the syntax element symbols SES are sequentially arranged according to the string values of the bin strings BS in the original binarization table (see FIG. 1). The BSs and the SESs may be arranged in a sequentially ascending order or a sequentially descending order. For the sake of simplicity, the BSs and the SESs of FIG. 7 are arranged in the sequentially ascending order. However, the invention is not limited thereto because the sequentially descending order may also be adopted.

In FIG. 7, the bin strings BS are arranged from small to large according to the corresponding string values thereof, so the arranging order of the bin strings BS is sequentially as follows: "0", "100", "101", "1110000", "110001", "110010", "110011", "110100", "110101", "110110", "110111", "1110000", "1110001", "1110010", "1110011", "1110100", "1110101", "1110110", "1110111", "1111000", "1111001", "111101", "111110" and "111111". Before the string values are compared, the lengths of all the bin strings in the table have to be unified, so "0" has to be added to end of the bin strings BS whose number of bins is smaller than 7. For example, the original bin string "0" is modified into "0000000", and the bin string "100" is modified into "1000000". Because the string value "1000000" is greater than the string value "0000000", the bin string "100" is arranged after the bin string "0", and soon. In addition, the syntax element symbols SES are sorted as "0", "1", "2", "3", "4", "5", "6", "7", "8", "9", "10", "12", "13", "14", "15", "16", "17", "18", "19", "20", "21", "23", "11" and "22" according to its corresponding string values.

As shown in step 414, the bin strings BS and the syntax element symbols SES are classified into groups 610(1) to 610(5) such that the bin strings BS contained in the groups 610(1) to 610(5) are continuous BSs, as shown in FIG. 8. For example, the bin string "0" and the bin string "100" are discontinuous. So, the bin string "0" and the bin string "100" respectively pertain to different groups 610(1) and 610(2). The bin string "100" and the bin string "101" are continuous, so the bin string "100" and the bin string "101" pertain to the same group 610(2), and so on.

As shown in step 416, the groups 610(1) to 610(5) are classified into groups 710(1) to 710(7), and N(i) LSBs of the first bin strings BS of the groups 710(1) to 710(7) are always 0. The number of original bin strings contained in each of the groups 710(1) to 710(7) is represented by M(i), wherein $M(i)=2^{N(i)}$, and i is a group number of the groups 710(1) to 710(7), for example, i=1, 2, 3, 4, 5, 6, 7, as shown in FIG. 9. For example, the number of bin strings contained in the group 610(4) is 10, which is not the power of 2. So, the group 610(4) has to be divided into the groups 710(4) and 710(5). Consequently, the numbers M(i) of bin strings contained in the groups 710(4) and 710(5) are equal to $2^{N(i)}$, and the values of N(i) LSBs in each set of first bin strings BS are equal to 0. Similarly, the number of bin strings contained in the group 610(5) is equal to 3, which is not the power of 2. So, the group 610(5) needs to be divided into the groups 710(6) and 710(7). Consequently, the numbers M(i) of bin strings contained in the groups 710(6) and 710(7) are equal to $2^{N(i)}$, and the values of N(i) LSBs in each set of first bin strings BS are equal to 0.

As shown in step 418, the groups 710(1) to 710(7) are classified into groups 810(1) to 810(8) such that the syntax element symbols SES contained in the groups 810(1) to 810(8) are continuous values, as shown in FIG. 10. For example, the syntax element symbols "11" and "22" contained in the group 710(7) are not continuous values, so the group 710(7) has to be divided into the groups 810(7) and 810(8). Consequently, the syntax element symbols SES contained in each of groups 810(1) to 810(8) are continuous values.

As shown in step 420, X(j) LSBs of the bin strings BS are removed to obtain the basic bin strings BBS. The number of original bin strings contained in each of the groups 810(1) to 810(8) is represented by Y(j), wherein $X(j)=\log_2 Y(j)$, and j is a group number of the groups 810(1) to 810(8), for example, j=1, 2, 3, 4, 5, 6, 7, 8, as shown in FIG. 10. The basic bin strings BBS include "0", "10", "110", "1110", "111100", "111101", "111110" and "111111". In more detail, let N=Y(j) and the step 420 is to remove $\log_2 N$ least significant bins (LSBs). For example, the number of bin strings contained in the group 810(2) is 2, so N=2, and $\log_2 2=1$. One LSB of each of the bin strings "100" and "101" of the group 810(2) is removed to obtain the basic bin string "10", as shown in FIG. 11. Similarly, the number of bin strings of the group 810(3) is 8, so N=8, and $\log_2 8=3$. Three LSBs of each of the bin strings "110000", "110001", "110010", "110011", "110100", "110101", "110110" and "110111" of the group 810(3) are removed to obtain the basic bin string "110", as shown in FIG. 11, and so on. In addition, for the sake of simplicity, X(j) is represented by the length L in FIG. 11. So, the lengths L of the groups 810(1) to 810(8) are sequentially 0, 1, 3, 3, 1, 0, 0 and 0.

As shown in step 422, the smallest syntax element symbols SES arranged in the groups 810(1) to 810(8) are selected to obtain the basic syntax element symbols BSES. When the smallest syntax element symbols SES arranged in the groups

810(1) to 810(8) are selected, the basic syntax element symbols BSES include "0", "1", "3", "12", "20", "23", "11" and "22".

As shown in step 424, the trimmed binarization table is obtained according to the basic syntax element symbol BSES, the basic bin string BBS and L (i.e., X(j)).

Please refer to FIGS. 11 and 12. FIG. 12 is a schematic example showing a trimmed binary search lookup table. The trimmed binarization table of FIG. 11 may be converted into the trimmed binary search lookup table of FIG. 12 through a specific software program. The trimmed binary search lookup table includes an input field Input and an output field Output. The input field Input includes a node Node and a bin Bin, and the output field Output includes an indicator NodeSE, a flag Flag and a length L. Different nodes Node and different bins Bin correspond to different indicators NodeSE, different flags Flag and different lengths L. The length L represents the number of bins, which have to be received in the next search or calculation.

The indicator NodeSE is either the basic syntax element symbol BSES or the next node Node depicted in FIG. 11 according to whether the flag Flag is equal to a predetermined value. For the sake of illustration, the subsequent description will be made with the predetermined value being equal to 1. For example, when the flag Flag is equal to 1, it represents that the binary search has ended, and the indicator NodeSE is one of the basic syntax element symbols BSES depicted in FIG. 11. Oppositely, when the flag Flag is equal to 0, it represents that the binary search has not ended yet, and the indicator NodeSE indicates the next node Node, and another binary search is performed according to the next node Node and the next bin Bin. When the length L is equal to n (n=0, 1, 2...), it represents that the next search or calculation still needs to receive n bins. In the de-binarization procedure, the search steps mentioned above can find out the syntax element symbol corresponding to the received bin string.

Figure 13:
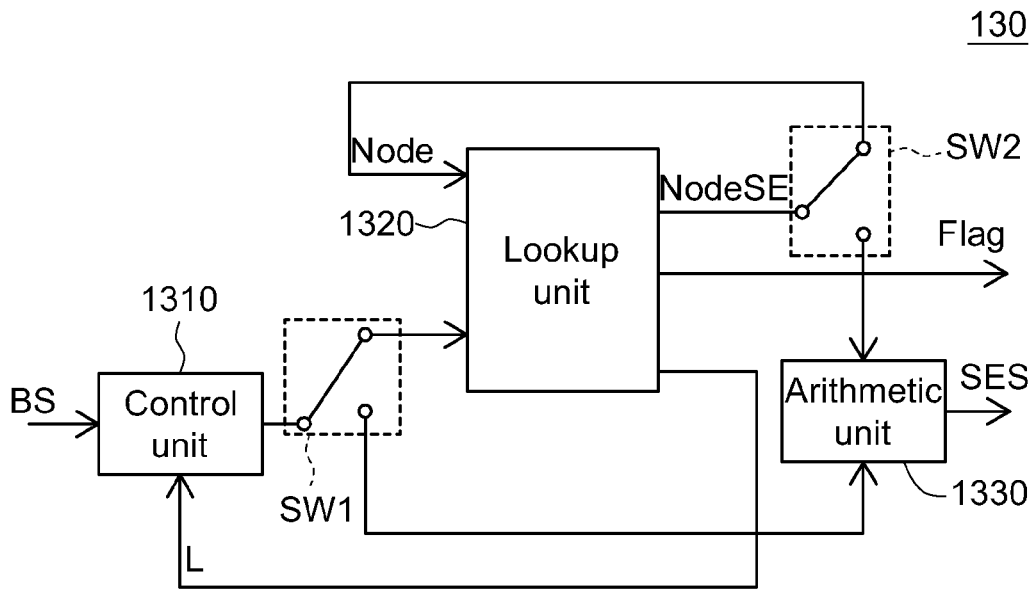
FIG. 13 is a block diagram showing a decoding apparatus, according to some of the exemplary embodiments of the disclosure.
Figure 14:
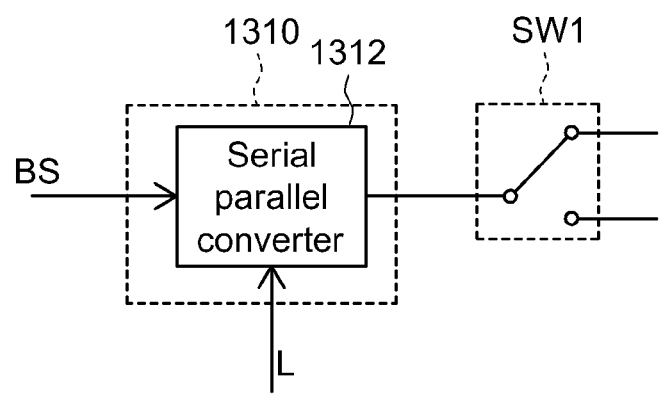
FIG. 14 is a block diagram showing a control unit, according to some of the exemplary embodiments of the disclosure.

FIG. 13 is a block diagram showing a decoding apparatus 130 according to some of the exemplary embodiments of the disclosure. Note that the decoding apparatus 130 may be a hardware device or a software application. FIG. 14 is a block diagram showing a control unit according to some of the exemplary embodiments of the disclosure. Please refer to FIGS. 13 and 14. The decoding apparatus 130 of FIG. 13 finds out the syntax element symbol SES corresponding to the bin string BS according to the trimmed binary search lookup table of FIG. 12. The decoding apparatus 130 includes a control unit 1310, a lookup unit 1320, an arithmetic unit 1330, a switch SW1 and a switch SW2. The control unit 1310 sequentially receives a part of the bin string BS, which may be a certain bin or some bins of the bin string BS. The control unit 1310 further includes a serial-to-parallel converter (S/P converter), and serially receives the bins of the bin string BS according to the length L and converts the received bins into the parallel data.

The lookup unit 1320 finds out the flag Flag, the length L and the indicator NodeSE from the trimmed binary search lookup table according to the received bin and the node Node, and judges whether the flag Flag is equal to a predetermined value. When the flag Flag is not equal to the predetermined value, the indicator NodeSE is the next node, and the control unit 1310 receives the subsequent bin in the bin string BS according to the length L. The lookup unit 1320 finds out the flag Flag, the length L and the indicator NodeSE from the trimmed binary search lookup table according to the subsequent bin and the next node Node. The search step is repeatedly performed until the flag Flag is equal to the predetermined value.

When the flag is equal to the predetermined value, the indicator is the basic syntax element symbol. The control unit 1310 receives the subsequent bin or bins in the bin string BS according to the length L. The arithmetic unit 1330 performs an addition operation according to the basic syntax element symbol and the subsequent bin or bins to find out the syntax element symbol SES corresponding to the bin string BS. The arithmetic unit 1330 may be an adder, for example.

When the flag Flag is not equal to the predetermined value, the switch SW1 connects the control unit 1310 to the lookup unit 1320 to output the subsequent bin to the lookup unit 1320, and the switch SW2 feeds the next node back to the lookup unit 1320. Oppositely, when the flag Flag is equal to the predetermined value, the switch SW1 connects the control unit 1310 to the arithmetic unit 1330 to output the subsequent bin or bins to the arithmetic unit 1330, and the switch SW2 outputs the basic syntax element symbol to the arithmetic unit 1330.

Figure 15:
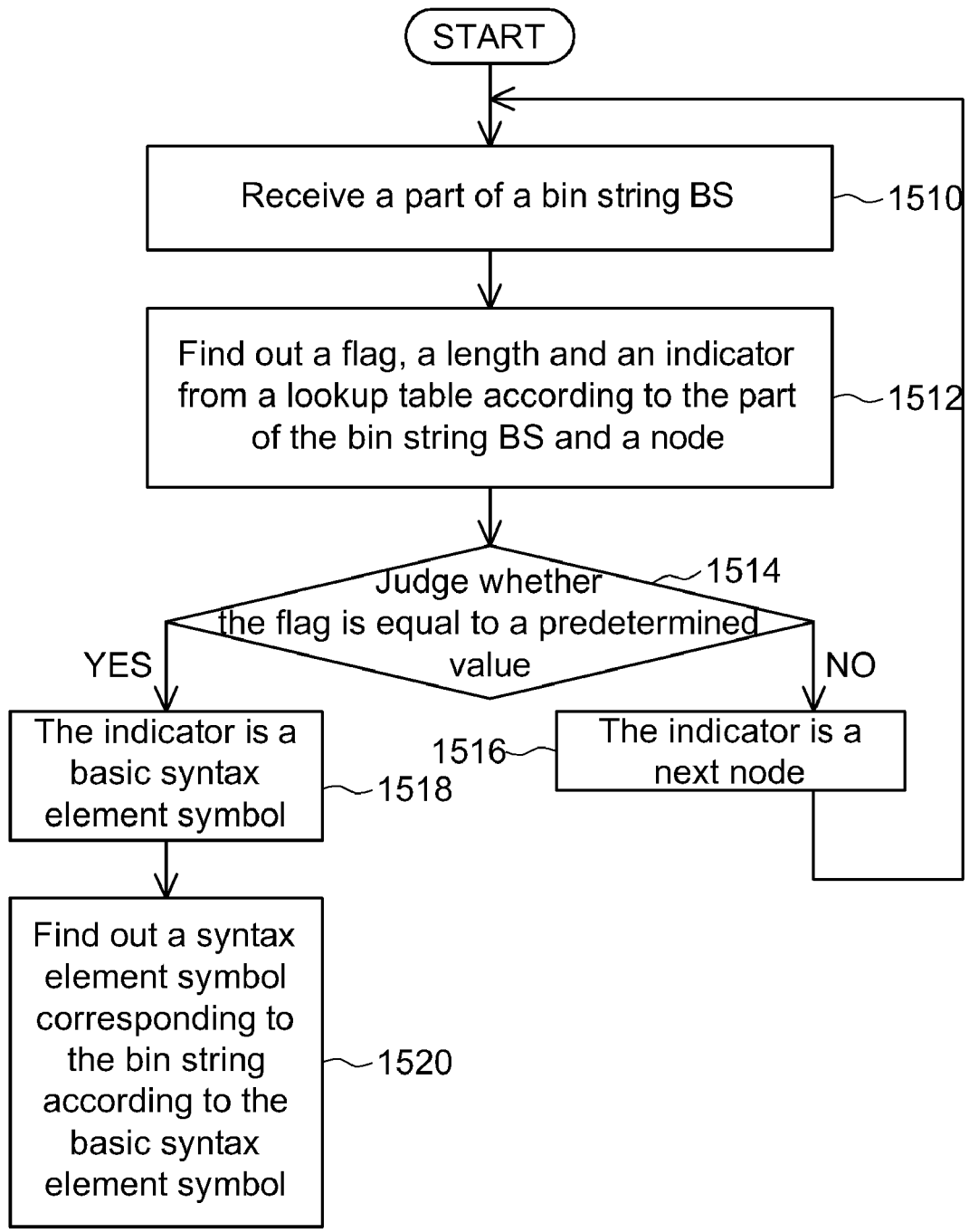
FIG. 15 is a flow chart showing a decoding method, according to an exemplary embodiment.

Please refer to FIGS. 13 and 15. FIG. 15 is a flow chart showing a decoding method according to an exemplary embodiment. The initial value of node Node must be 0. The decoding method may be applied to the decoding apparatus 130 and include the following steps.

As shown in step 1510, the control unit 1310 receives a part of the bin string BS, which may be a certain bin or some bins of the bin string BS. As shown in step 1512, the lookup unit 1320 finds out the flag Flag, the length L and the indicator NodeSE, from the trimmed binary search lookup table according to the received part of the bin string BS and the node Node. As shown in step 1514, it is judged whether the flag is equal to the predetermined value. When the flag is not equal to the predetermined value, as shown in step 1516, the indicator NodeSE is the next node Node and the steps 1510, 1512 and 1514 are repeated.

Oppositely, when the flag is equal to the predetermined value, as shown in step 1518, the indicator NodeSE is the basic syntax element symbol. As shown in step 1520, the arithmetic unit 1330 finds out the syntax element symbol SES corresponding to the bin string BS according to the basic syntax element symbol. In the step 1520, the control unit 1310 receives the subsequent bin or bins of the bin string according to the length L such that the arithmetic unit 1330 performs an addition operation on the subsequent bin or bins and the basic syntax element symbol to output the syntax element symbol SES.

FIG. 16 is a schematic example showing how to decode a syntax element symbol from a bin string 1111001 by using the trimmed binary search lookup table. As shown in FIG. 16, how the corresponding syntax element symbol "21" is found out is described with reference to the bin string "1111001".

First, the node Node is equal to "0", and the first bin Bin of the bin string is equal to "1". The first time of binary search is performed according to the node "0" and the bin "1" to find out the flag Flag, the indicator NodeSE and the length L corresponding to the node "0" and the bin "1". At this time, the flag Flag is "0", the indicator NodeSE is "1", and the length L is "1". Because the flag Flag is "0", it represents that the search has not ended yet. Because the indicator NodeSE is "1", it represents that the next node is "1". The length L equal to "1" represents that one more subsequent bin has to be received, wherein the subsequent bin is the second bin of the bin string.

Next, the node Node is equal to "1", and the second bin of the bin string is equal to "1". The second time of binary search is performed according to the node "1" and the bin "1" to find out the flag Flag, the indicator NodeSE and the length L corresponding to the node "1" and the bin "1". At this time, the flag Flag is "0", the indicator NodeSE is "2", and the length L is "1". Because the flag Flag is "0", it represents that the search has not ended yet. Because the indicator NodeSE is "2", it represents that the next node Node is "2". The length L equal to "1" represents that one more subsequent bin has to be received, wherein the subsequent bin is the third bin of the bin string.

Thereafter, the node Node is equal to "2", and the third bin of the bin string is equal to "1". The third time of binary search is performed according to the node "2" and the bin "1" to find out the flag Flag, the indicator NodeSE and the length L corresponding to the node "2" and the bin "1". At this time, the flag Flag is "0", the indicator NodeSE is "3", and the length L is "1". Because the flag Flag is "0", it represents that the search has not ended yet. Because the indicator NodeSE is "3", it represents that the next node Node is "3". The length L equal to "1" represents that one more subsequent bin has to be received, wherein the subsequent bin is the fourth bin of the bin string.

Then, the node Node is equal to "3", and the fourth bin of the bin string is equal to "1". The fourth time of binary search is performed according to the node "3" and the bin "1" to find out the flag Flag, the indicator NodeSE and the length L corresponding to the node "3" and the bin "1". At this time, the flag Flag is "0", the indicator NodeSE is "4", and the length L is "1". Because the flag Flag is "0", it represents that the search has not ended yet. Because the indicator NodeSE is "4", it represents that the next node Node is "4". The length L equal to "1" represents that one more subsequent bin has to be received, wherein the subsequent bin is the fifth bin of the bin string.

Next, the node Node is equal to "4", and the fifth bin of the bin string is equal to "0". The fifth time of binary search is performed according to the node "4" and the bin "0" to find out the flag Flag, the indicator NodeSE and the length L corresponding to the node "4" and the bin "0". At this time, the flag Flag is "0", the indicator NodeSE is "5", and the length is "1". Because the flag Flag is "0", it represents that the search has not ended yet. Because the indicator NodeSE is "5", it represents that the next node Node is "5". The length L equal to "1" represents that one more subsequent bin has to be received, wherein the subsequent bin is the sixth bin of the bin string.

Thereafter, the node Node is equal to "5", and the sixth bin of the bin string is equal to "0". The sixth time of binary search is performed according to the node "5" and the bin "0" to find out the flag Flag, the indicator NodeSE and the length L corresponding to the node "5" and the bin "0". At this time, the flag Flag is "1", the indicator NodeSE is "20", and the length is "1". Because the flag Flag is "1", it represents that the search has ended. Because the indicator NodeSE is "20", it represents that the basic syntax element symbol is "20". The length L equal to "1" represents that one more subsequent bin has to be received, wherein the subsequent bin is the seventh bin of the bin string. The seventh bin of the bin string is equal to "1". The basic syntax element symbol "20" and the subsequent bin "1" are added together to obtain that the syntax element symbol corresponding to the bin string "1111001" is equal to 21.

FIG. 26 is a schematic example showing a trimmed binarization table arranged in a descending order. Please refer to FIGS. 10, 11, and 16. The basic syntax element symbols BSES in FIG. 11 are respectively selected from the smallest syntax element symbols SES arranged in the groups 810(1) to 810(8). Thus, the description of FIG. 16 is to perform an addition operation on the basic syntax element symbol "20" and the subsequent bin "1" to obtain the syntax element symbol of 21. Alternatively, when the syntax element symbol SES and the bin string BS of the trimmed binarization table are sequentially arranged in a descending order, as shown in FIG. 26, the basic syntax element symbols BSES may be respectively selected from the smallest syntax element symbols SES arranged in the groups 810(1) to 810(8). Therefore, the addition operation may be performed to obtain the syntax element symbol according to the basic syntax element symbol and the subsequent bin.

Figure 19:
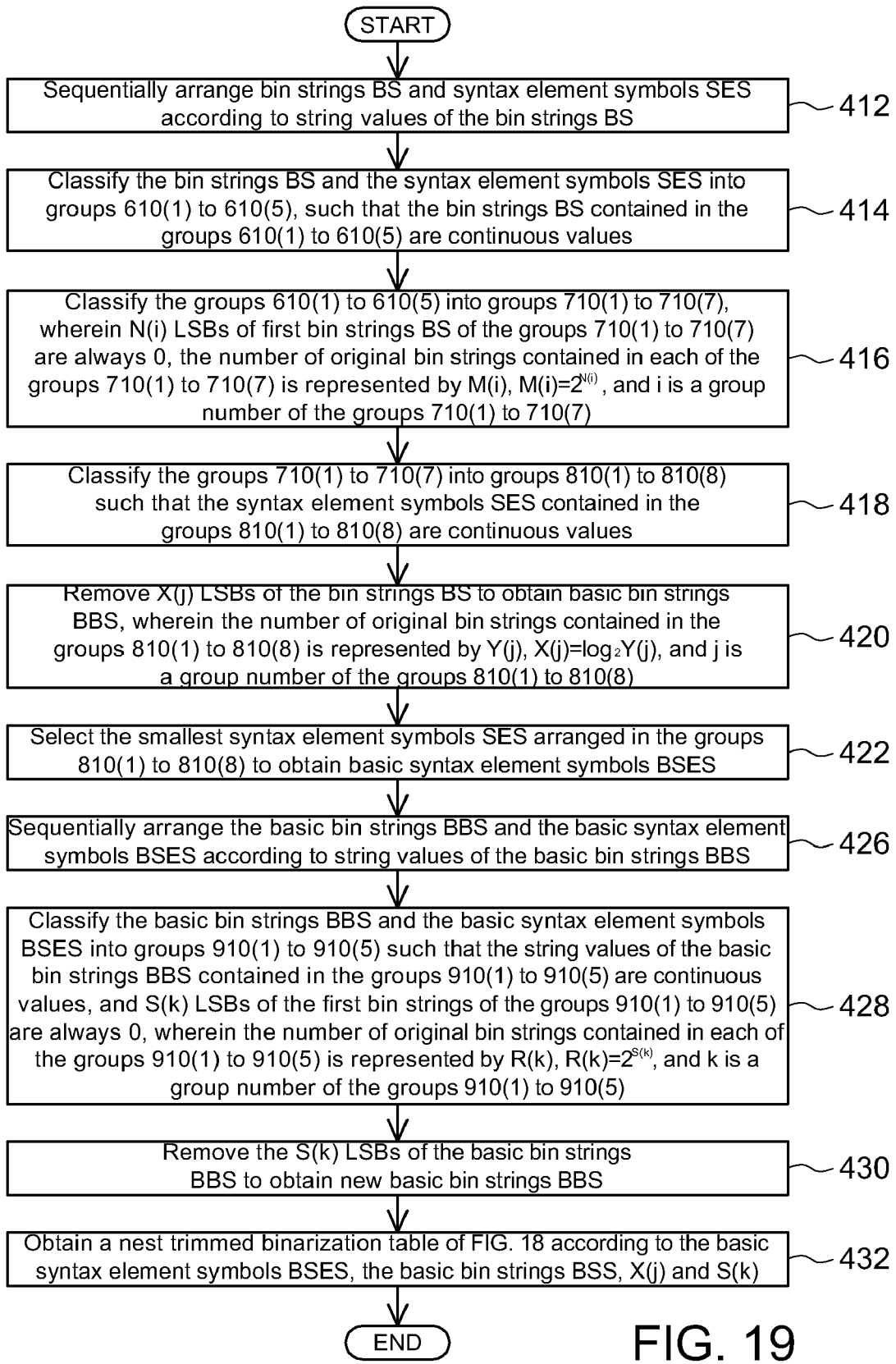
FIG. 19 is a flow chart showing an example of method of generating the nest trimmed binarization table.

FIGS. 17 and 18 are schematic examples showing the generation of a nest trimmed binarization table according to an embodiment. FIG. 19 is a flow chart showing an example of method of generating the nest trimmed binarization table. Please refer simultaneously to FIGS. 17 to 19. The trimmed binarization table of FIG. 11 may further be modified into the nest trimmed binarization table of FIG. 18.

In detail, the method of generating the nest trimmed binarization table includes the following steps. First, the steps 412 to 422 are performed. Because the steps 412 to 422 have been described with reference to FIG. 6, detailed descriptions thereof will be omitted.

As shown in step 426, the basic bin strings BBS and the basic syntax element symbols BSES are sequentially arranged in a sequentially ascending manner or a sequentially descending manner according to the string values of the basic bin strings BBS in the trimmed binarization table (see FIG. 11). For the sake of illustration, the sequentially ascending manner in FIG. 17 will be described as an example. However, the invention is not limited thereto, and the sequentially descending manner may also be adopted. In FIG. 17, the basic bin strings BBS are arranged from small to large according to the corresponding string values, so the arranging order of the basic bin strings BBS is sequentially as follows: "0", "10", "110", "1110", "111100", "111101", "111110" and "111111". In addition, the basic syntax element symbols BSES are sequentially "0", "1", "3", "12", "20", "23", "11" and "22", as shown in FIG. 17.

As shown in step 428, the basic bin strings BBS and the basic syntax element symbols BSES are classified into groups 910(1) to 910(5), such that the string values of the basic bin strings BBS contained in the groups 910(1) to 910(5) are continuous values and S(k) LSBs of the first bin strings of the groups 910(1) to 910(5) have to be 0. The number of original bin strings contained in each of the groups 910(1) to 910(5) is represented by R(k), wherein $R(k)=2^{S(k)}$, k is a group number of the groups 910(1) to 910(5), and k=1, 2, 3, 4, 5, as shown in FIG. 17.

As shown in step 430, the S(k) LSBs of the basic bin strings BBS are removed to obtain the new basic bin strings BBS. The S(k) may be regarded as the new length L. For example, the number of basic bin strings of the group 910(5) is 4, so N=4 and $log_2 4=2$. Two LSBs of the bin strings "111100", "111101", "111110" and "111111" of the group 910(5) are removed to obtain the new length 2 and the basic bin string "1111", as shown two right-hand sided fields of FIG. 17. However, this pair of the newly generated length and the basic bin string is different from those of others. This pair of length and basic bin string represents another binarization table with two bins, and the pair of length and basic bin string of any other represents the basic syntax element symbol.

As shown in step 432, the nest trimmed binarization table shown in FIG. 18 is obtained according to the basic syntax element symbol BSES, the basic bin string BSS and L (i.e., X(j) and S(k)).

As shown in FIGS. 17 and 18, it is obtained that the two trimmed results only influence the basic bin strings "111100", "111101", "111110" and "1111111" but does not influence the basic bin strings "0", "10", "110" and "1110". These influenced basic bin strings are characterized in that the string values thereof are continuous but the corresponding basic syntax element symbols BSES are discontinuous. Although the nest trimmed binarization table of FIG. 18 is obtained after the original binarization table is trimmed twice, the invention is not limited thereto. Different original binarization tables may be trimmed multiple times to obtain the corresponding multi-nest trimmed binarization tables.

The nest trimmed binarization table of FIG. 18 includes two trimmed binarization tables, the BSES filed is shared, the right-sided L and BBS pertain to the upper trimmed binarization table, while the left-sided L and BBS pertain to the lower trimmed binarization table. The basic bin string "1111" in the upper trimmed binarization table covers a part of information of the lower trimmed binarization table.

Referring back to FIG. 5, it is found that the aspect of the basic bin string BBS in the upper trimmed binarization table of FIG. 18 is the same as that of TU-type, and the maximum length is 4. The aspect of the basic bin string BBS in the lower trimmed binarization table of FIG. 18 is the same as that of the FL-Type. Consequently, it is obtained that the original binarization table may be repeatedly trimmed until the best trimmed aspect of the basic bin string BBS is the same as that of the TU-type. In other words, steps 426, 428, 430, and 432 in FIG. 19 may repeat several times. However, the so-called TU-type of the disclosure is not limited to the bin string with the leading 1, and may also be applied to the bin string with the leading 0. For example, the best trimmed aspect of the basic bin string BBS may be sequentially "1", "01", "001", "0001" and "0000". It is obtained, from the arranging rule thereof, that. except the last BBS is all "0", each of the other basic bin strings ends with the bin "1" in this coding method. The bin appearing before the bin "1" must be the bin "0".

FIG. 20 is a schematic example showing a nest trimmed binary search lookup table. FIG. 21 is a schematic example showing how to decode a syntax element symbol from a bin string 1111001 by using the nest trimmed binary search lookup table. Please refer simultaneously to FIGS. 20 and 21. The nest trimmed binarization table of FIG. 18 may be converted into the nest trimmed binary search lookup table of FIG. 20 through a specific software program. Although the nest trimmed binary search lookup table of FIG. 20 is not completely the same as the trimmed binary search lookup table of FIG. 11, the exemplary embodiment still can adopt the decoding apparatus and the decoding method to find out the syntax element symbol corresponding to the bin string. How to find out the corresponding syntax element symbol "21" will be described in the following by taking the bin string "1111001" as an example.

First, the node Node is equal to "0", and the first bin Bin of the bin string is equal to "1". The first time of binary search is performed according to the node "0" and the bin "1" to find out the flag Flag, the indicator NodeSE and the length L corresponding to the node "0" and the bin "1". At this time, the flag Flag is "0", the indicator NodeSE is "1", and the length L is "1". Because the flag Flag is "0", it represents that the search has not ended yet. Because the indicator NodeSE is "1", it represents that the next node is "1". The length L equal to "1" represents that one more subsequent bin has to be received, wherein the subsequent bin is the second bin of the bin string.

Next, the node Node is equal to "1", and the second bin of the bin string is equal to "1". The second time of binary search is performed according to the node "1" and the bin "1" to find out the flag Flag, the indicator NodeSE and the length L corresponding to the node "1" and the bin "1". At this time, the flag Flag is "0", the indicator NodeSE is "2", and the length L is "1". Because the flag Flag is "0", it represents that the search has not ended yet. Because the indicator NodeSE is "2", it represents that the next node Node is "2". The length L equal to "1" represents that one more subsequent bin has to be received, wherein the subsequent bin is the third bin of the bin string.

Thereafter, the node Node is equal to "2", and the third bin of the bin string is equal to "1". The third time of binary search is performed according to the node "2" and the bin "1" to find out the flag Flag, the indicator NodeSE and the length L corresponding to the node "2" and the bin "1". At this time, flag Flag is "0", the indicator NodeSE is "3", and the length L is "1". Because the flag Flag is "0", it represents that the search has not ended yet. Because the indicator NodeSE is "3", it represents that the next node Node is "3". The length L equal to "1" represents that one more subsequent bin has to be received, wherein the subsequent bin is the fourth bin of the bin string.

Then, the node Node is equal to "3", and the fourth bin of the bin string is equal to "1". The fourth time of binary search is performed according to the node "3" and the bin "1" to find out the flag Flag, the indicator NodeSE and the length L corresponding to the node "3" and the bin "1". At this time, flag Flag is "0", the indicator NodeSE is "4", and the length L is "2". Because the flag Flag is "0", it represents that the search has not ended yet. Because the indicator NodeSE is "4", it represents that the next node Node is "4". The length L equal to "2" represents that two more subsequent bins have to be received, wherein the subsequent bins are the fifth and sixth bins of the bin string.

Next, the node Node is equal to "4", and the fifth and sixth bins of the bin string are equal to "0". The fifth time of binary search is performed according to the node "4" and the bins "00" to find out the flag Flag, the indicator NodeSE and the length L corresponding to the node "4" and the bins "00". At this time, flag Flag is "1", the indicator NodeSE is "20", and the length is "1". Because the flag Flag is "1", it represents that the search has ended. Because the indicator NodeSE is "20", it represents that the basic syntax element symbol is "20". The length L equal to "1" represents that one more subsequent bin has to be received, wherein the subsequent bin is the seventh bin of the bin string. The seventh bin of the bin string is equal to "1". The basic syntax element symbol "20" and the subsequent bin "1" are added together to obtain the syntax element symbol "21" corresponding to the bin string "1111001".

Referring back to FIG. 18, it is found that the aspect of the basic bin string BBS in the upper trimmed binarization table of FIG. 18 is the same as that of the TU-type. Therefore, the corresponding flag, indicator, and length are found out by further continuously counting the number of bins of "1" in the received bin string. However, the invention is not limited thereto. With the change of the aspect of the basic bin string BBS, it is also possible to find out the corresponding flag, indicator and length by continuously counting the number of bins of "0" in the received bin string. For the sake of illustration, the TU-type will be described as an example subsequently.

Figure 22:
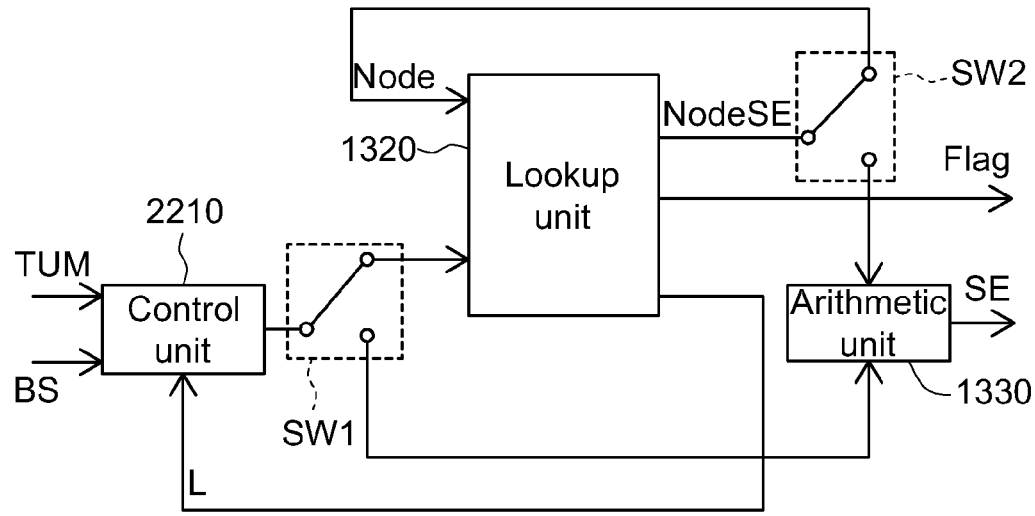
FIG. 22 is a block diagram showing a decoding apparatus according to an exemplary embodiment.
Figure 23:
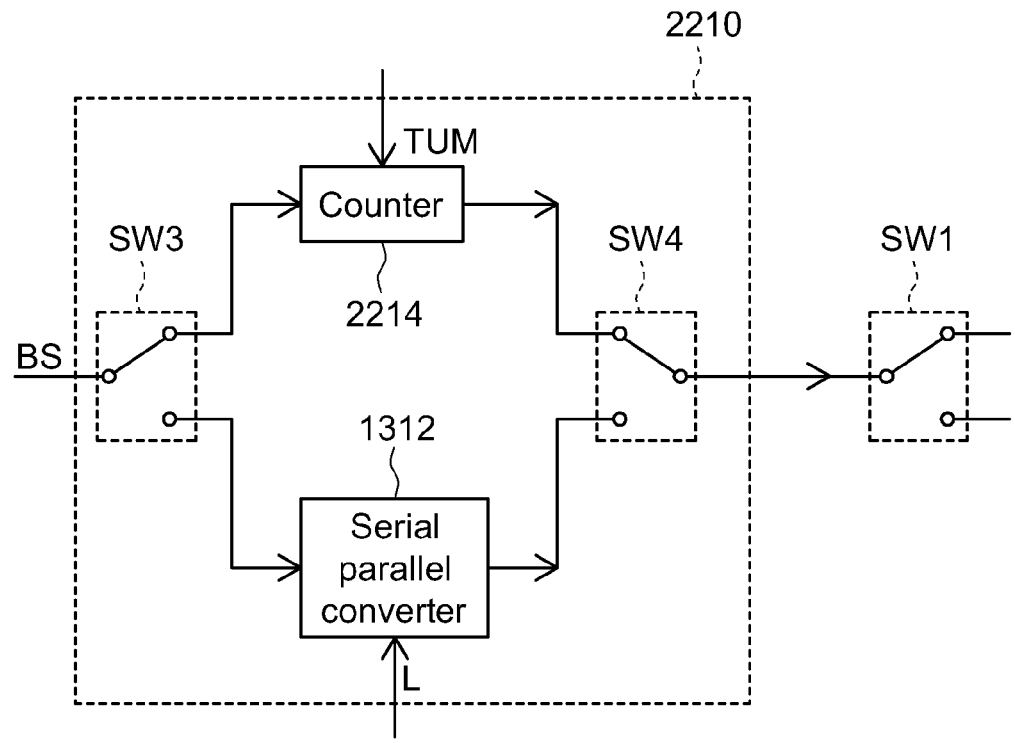
FIG. 23 is a block diagram showing a control unit according to an exemplary embodiment.

FIG. 22 is a block diagram showing a decoding apparatus 220 according to an exemplary embodiment. Note that the decoding apparatus 220 may be a hardware device or a software application. FIG. 23 is a block diagram showing a control unit 2210 according to the exemplary embodiment. As shown in FIGS. 22 and 23, the difference between the decoding apparatus 220 of FIG. 22 and the decoding apparatus 130 of FIG. 13 is that the control unit 2210 is different from the control unit 1310.

The control unit 2210 includes a serial-to-parallel converter 1312 and further includes a counter 2214, a switch SW3 and a switch SW4. The counter 2214 continuously counts the number of leading of 1 within the maximum length TUM in the bin string BS. For example, the counter 2214 continuously counts the number of bins having the leading bin equal to "1" in the bin string BS. Before the counter 2214 receives the bin "0" or counts to the maximum length TUM, the number of bins of "1" in the bin string BS is continuously counted so that the lookup unit 1320 finds out the corresponding flag Flag, indicator NodeSE and length L. When the counter is counting, the switch SW3 outputs the bin of the bin string to the counter 2214, and the switch SW4 is connected to the counter 2214 and the switch SW1. After the counter finishes counting, the switch SW3 outputs the bin of the bin string to the serial-to-parallel converter 1312, and the switch SW4 is connected to the serial-to-parallel converter 1312 and the switch SW1.

FIG. 24 is a schematic example showing a nest trimmed lookup table. FIG. 25 is a schematic example showing how to decode a syntax element symbol from a bin string 1111001 by using the nest trimmed lookup table. Please refer simultaneously to FIGS. 24 and 25. The corresponding flag Flag, indicator NodeSE and length L are found out by continuously counting. The Count/Bin of FIG. 24 represents the number of leading bins or the bin value. The Count/Bin is the number of leading bins when the TU bin string is decoded and is the bin value when the FL bin string is decoded. The nest trimmed binary search lookup table of FIG. 20 is modified into the nest trimmed lookup table of FIG. 24. In addition, the decoding apparatus 220 of FIG. 22 and the decoding method are adopted to find out the syntax element symbol corresponding to the bin string. How to find out the corresponding syntax element symbol "21" will be described by taking the bin string "1111001" as an example.

First, the node Node is initialized to "0", and four bins "1" are continuously counted. The four leading bins have the same bin value. The flag Flag, the indicator NodeSE and the length L corresponding to the node "0" and the four bins "1" are found out according to the node "0" and the four bins "1". At this time, the flag Flag is "0", the indicator NodeSE is "5", and the length L is "2". Because the flag Flag is "0", it represents that the search has not ended yet. Because the indicator NodeSE is "5", it represents that the next node is "5". The length L equal to "2" represents that two more subsequent bins have to be received, wherein the subsequent bins are the fifth and sixth bins of the bin string.

Next, the node Node is equal to "5", and the fifth and sixth bins of the bin string are equal to "0". The flag Flag, the indicator NodeSE and the length L corresponding to the node "4" and the bin "00" are found out according to the node "5" and the bin "00". At this time, the flag Flag is "1", the indicator NodeSE is "20", and the length is "1". Because the flag Flag is "1", it represents that the search has ended. Because the indicator NodeSE is "20", it represents that the basic syntax element is the symbol "20". The length L equal to "1" represents that one more subsequent bin has to be received, wherein the subsequent bin is the seventh bin of the bin string equal to "1". The basic syntax element symbol "20" and the subsequent bin "1" are added together to obtain the syntax element symbol of "21" corresponding to the bin string "1111001".

The trimmed binary search lookup table, the nest trimmed binary search lookup table and the nest trimmed lookup table are created in the offline work, and thus cannot influence the decoding speed. In addition, the disclosure is adapted to various H.264 coding methods so that different coding methods share the same hardware or software resource. Furthermore, the disclosed embodiments may only needs the hardware or software regardless of the type of the binarization table. In addition, the disclosed embodiments may further support the variable length coding (VLC) with other coding standards (e.g., JPEG, MPEG, VC1 and the like).

While the invention has been described by way of examples and in terms of exemplary embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A decoding method, comprising the steps of:
   receiving a part of a bin string;
   finding out a flag, a length and an indicator from a lookup table according to the part of the bin string and a node; and
   judging whether the flag is equal to a predetermined value;
   when the flag isn't equal to the predetermined value, the indicator indicates a next node; and
   when the flag is equal to the predetermined value, the indicator indicates a basic syntax element symbol, and a syntax element symbol corresponding to the bin string is found out according to the basic syntax element symbol.

2. The method according to claim 1, wherein when the flag isn't equal to the predetermined value, another part of the bin string is received according to the length, and another flag, another length and another indicator are found out from the lookup table according to the another part of the bin string and the next node.

3. The method according to claim 1, wherein when the flag is equal to the predetermined value, another part of the bin string is received according to the length, and the syntax element symbol corresponding to the bin string is found out according to the another part of the bin string and the basic syntax element symbol.

4. The method according to claim 3, wherein an addition operation is performed, according to the another part of the bin string and the basic syntax element symbol, to find out the syntax element symbol.

5. The method according to claim 1, wherein the step of finding out the flag, the length and the indicator from the lookup table comprises:
   continuously counting the number of leading bins in the part of the bin string, wherein the leading bins have the same bin value; and
   finding out the flag, the length and the indicator according to the number of leading bins and the node.

6. The method according to claim 1, further comprising the step of:
   generating the lookup table according to an original binarization table, which comprises a plurality of original bin strings and a plurality of original syntax element symbols respectively corresponding to the original bin strings.

7. The method according to claim 6, further comprising the steps of:
   generating a trimmed binarization table according to the original binarization table; and
   generating the lookup table according to the trimmed binarization table.

8. The method according to claim 7, further comprising the steps of:
- arranging the original bin strings and the original syntax element symbols according to string values of the original bin strings;
- classifying the original bin strings and the original syntax element symbols into a plurality of first groups such that the string values of the original bin strings contained in each of the first groups are continuous values;
- classifying the first groups into a plurality of second groups, wherein N(i) LSBs of first bin strings of the second groups are always 0, the number of original bin strings contained in each of the second groups is represented by M(i), M(i)=2N(i), and i is a group number of the second groups;
- classifying the second groups into a plurality of third groups such that the original syntax element symbols contained in each of the third groups are continuous values;
- removing X(j) LSBs of the original bin strings to obtain a plurality of first basic bin strings, wherein the number of original bin strings contained in each of the third groups is represented by Y(j), X(j)=log 2Y(j), and j is a group number of the third groups;
- selecting a smallest original syntax element symbol in each of the third groups to obtain a plurality of first basic syntax element symbols; and
- obtaining the trimmed binarization table according to the first basic syntax element symbols, the first basic bin strings and L, where L=X(j).

9. The method according to claim 8, wherein the original bin strings and the original syntax element symbols are sequentially arranged in an ascending order according to the string values.

10. The method according to claim 8, wherein the original bin strings and the original syntax element symbols are sequentially arranged in a descending order according to the string values.

11. The method according to claim 6, further comprising the steps of:
- generating a nest trimmed binarization table according to the original binarization table; and
- generating a nest trimmed binary search lookup table according to the nest trimmed binarization table.

12. The method according to claim 11, wherein the step of generating the nest trimmed binarization table comprises:
- arranging the original bin strings and the original syntax element symbols according to string values of the original bin strings;
- classifying the original bin strings and the original syntax element symbols into a plurality of first groups such that the string values of the original bin strings contained in each of the first groups are continuous values;
- classifying the first groups into a plurality of second groups, wherein N(i) LSBs of first bin strings of the second groups are always 0, the number of original bin strings contained in each of the second groups is represented by M(i), M(i)=2N(i), and i is a group number of the second groups;
- classifying the second groups into a plurality of third groups such that the original syntax element symbols contained in each of the third groups are continuous values;
- removing X(j) LSBs of the original bin strings to obtain a plurality of first basic bin strings, wherein the number of original bin strings contained in each of the third groups is represented by Y(j), X(j)=log 2Y(j), and j is a group number of the third groups;
- selecting a smallest original syntax element symbol in each of the third groups to obtain a plurality of first basic syntax element symbols;
- obtaining the trimmed binarization table according to the first basic syntax element symbols, the first basic bin strings and L, where L=X(j);
- sequentially arranging the first basic bin strings and the first basic syntax element symbols according to the string values of the first basic bin strings;
- classifying the first basic bin strings and the first basic syntax element symbols into a plurality of fourth groups such that the string values of the first basic bin strings contained in each of the fourth groups are continuous values, and S(k) LSBs of the first bin strings of the fourth groups are always, the number of original bin strings contained in each of the fourth groups is represented by R(k), R(k)=2S(k), and k is a group number of the fourth groups;
- removing the S(k) LSBs of the first basic bin strings to obtain a plurality of second basic bin strings; and
- obtaining the nest trimmed binarization table according to the first basic syntax element symbols, the first basic bin strings, the second basic bin strings, and L, where L=X(j) or S(k).

13. The method according to claim 12, wherein the step of generating the nest trimmed binarization table is repeatedly performed.

14. The method according to claim 12, wherein the original bin strings and the original syntax element symbols are sequentially arranged in an ascending order according to the string values.

15. The method according to claim 12, wherein the original bin strings and the original syntax element symbols are sequentially arranged in a descending order according to the string values.

16. The method according to claim 11, wherein in the step of generating the nest trimmed binarization table, an upper trimmed binarization table and a lower trimmed binarization table of the nest trimmed binarization table are generated, the upper trimmed binarization table is truncated unary process or unary process, which is considered as a truncated unary process with an infinite maximum length theoretically or a very large maximum length practically, and the lower trimmed binarization table is fixed length process.

17. A decoding apparatus, comprising:
- a control unit for receiving a part of a bin string;
- a lookup unit for finding out a flag, a length and an indicator from a lookup table according to the part of the bin string and a node, and judging whether the flag is equal to a predetermined value, wherein when the flag isn't equal to the predetermined value, the indicator is a next node;
- an arithmetic unit, wherein the indicator is a basic syntax element symbol when the flag is equal to the predetermined value, and the arithmetic unit finds out a syntax element symbol corresponding to the bin string according to the basic syntax element symbol;
- a first switch for selectively connecting the control unit to the lookup unit or the arithmetic unit; and
- a second switch for selectively outputting the basic syntax element symbol to the arithmetic unit or feeding the next node back to the lookup unit.

18. The apparatus according to claim 17, wherein when the flag isn't equal to the predetermined value, the control unit receives another part of the bin string according to the length, and the lookup unit finds out another flag, another length and another indicator from the lookup table according to the another part of the bin string and the next node.

19. The apparatus according to claim 17, wherein when the flag is equal to the predetermined value, the control unit receives another part of the bin string according to the length, and the arithmetic unit finds out the syntax element symbol corresponding to the bin string according to the another part of the bin string and the basic syntax element symbol.

20. The apparatus according to claim 19, wherein the arithmetic unit is an adder.

21. The apparatus according to claim 17, wherein the control unit comprises:

a serial-to-parallel converter for receiving the bin string according to the length.

22. The apparatus according to claim 21, wherein the control unit further comprises:
- a counter for continuously counting the number of bins having the same bin value in the part of the bin string;
- a third switch for selectively outputting the bin string to the counter or the serial-to-parallel converter; and
- a fourth switch for selectively connecting the counter or the serial-to-parallel converter to the first switch.

* * * * *